United States Patent
Boehm et al.

(10) Patent No.: US 9,252,464 B2
(45) Date of Patent: Feb. 2, 2016

(54) METHOD FOR BALANCING STATES OF CHARGE OF A BATTERY HAVING A PLURALITY OF BATTERY CELLS AS WELL AS A CORRESPONDING BATTERY MANAGEMENT SYSTEM AND A BATTERY

(75) Inventors: Andre Boehm, Kornwestheim (DE); Christoph Brochhaus, Aachen (DE)

(73) Assignee: Robert Bosch GmbH, Stuttgart (DE)

( * ) Notice: Subject to any disclaimer, the term of this patent is extended or adjusted under 35 U.S.C. 154(b) by 738 days.

(21) Appl. No.: 13/581,043

(22) PCT Filed: Jan. 4, 2011

(86) PCT No.: PCT/EP2011/050060
§ 371 (c)(1),
(2), (4) Date: Nov. 5, 2012

(87) PCT Pub. No.: WO2011/104044
PCT Pub. Date: Sep. 1, 2011

(65) Prior Publication Data
US 2013/0147434 A1    Jun. 13, 2013

(30) Foreign Application Priority Data
Feb. 25, 2010   (DE) .................. 10 2010 002 326

(51) Int. Cl.
*H02J 7/00*   (2006.01)
*G01R 31/36*  (2006.01)
(Continued)

(52) U.S. Cl.
CPC .......... *H01M 10/44* (2013.01); *H01M 10/4207* (2013.01); *H01M 10/441* (2013.01); *H01M 10/482* (2013.01); *H02J 7/0014* (2013.01); *H01M 10/52* (2013.01); *Y02T 10/7055* (2013.01)

(58) Field of Classification Search
CPC ....................................... H01M 10/44
USPC ............................ 320/132; 702/63
See application file for complete search history.

(56) References Cited

U.S. PATENT DOCUMENTS

| | | | |
|---|---|---|---|
| 7,193,391 B2 | 3/2007 | Moore | |
| 7,193,392 B2 | 3/2007 | King et al. | |

(Continued)

FOREIGN PATENT DOCUMENTS

| | | | |
|---|---|---|---|
| CN | 101065876 A | 10/2007 | |
| DE | 10 2006 022 394 A1 | 11/2007 | |

(Continued)

OTHER PUBLICATIONS

International Search Report corresponding to PCT Application No. PCT/EP2011/050060 mailed Jun. 10, 2011 (German and English language document) (7 pages).

*Primary Examiner* — Richard V Muralidar
(74) *Attorney, Agent, or Firm* — Maginot Moore & Beck LLP

(57) ABSTRACT

A method for balancing states of charge of battery cells of a battery includes determining the individual cell capacities of the cells. A k-th cell having the smallest cell capacity, the individual states of charge, the depth of discharge, a target depth of discharge, and a target state of charge are determined. The deviation of the state of charge of a cell from the target state of charge ($\Delta SOC_{target,n}$) and the minimum deviation of the state of charge of a cell from the target state of charge ($\Delta SOC_{min}$) are determined. At least one of the cells, to which $\Delta SOC_{target,n} - \Delta SOC_{min} > X$ applies, where $X \geq 0$, is discharged. If $\Delta SOC_{target,n} - \Delta SOC_{min} \leq X$ applies to all cells, the method ends. If this condition does not apply to all cells, the individual states of charge are determined again and the method is repeated.

11 Claims, 3 Drawing Sheets

(51) Int. Cl.
*H01M 10/44* (2006.01)
*H01M 10/42* (2006.01)
*H01M 10/48* (2006.01)
*H01M 10/52* (2006.01)

(56) References Cited

U.S. PATENT DOCUMENTS

| | | | |
|---|---|---|---|
| 7,489,106 B1 | 2/2009 | Tikhonov | |
| 8,049,465 B2* | 11/2011 | Barsoukov | H01M 10/482 320/132 |
| 8,493,031 B2* | 7/2013 | Murao | H02J 7/0016 320/132 |
| 2006/0097698 A1 | 5/2006 | Plett | |
| 2011/0175571 A1* | 7/2011 | Renken | H02J 7/0078 320/112 |

FOREIGN PATENT DOCUMENTS

| | | |
|---|---|---|
| DE | 10 2007 036 146 A1 | 2/2008 |
| EP | 1 670 113 A2 | 6/2006 |
| JP | 2009-178040 A | 8/2009 |
| WO | 2008/151659 A2 | 12/2008 |
| WO | 2010/001090 A2 | 1/2010 |

\* cited by examiner

METHOD FOR BALANCING STATES OF CHARGE OF A BATTERY HAVING A PLURALITY OF BATTERY CELLS AS WELL AS A CORRESPONDING BATTERY MANAGEMENT SYSTEM AND A BATTERY This application is a 35 U.S.C. §371 National Stage Application of PCT/EP2011/050060, filed on Jan. 4, 2011, which claims the benefit of priority to Serial No. DE 10 2010 002 326.4, filed on Feb. 25, 2010 in Germany, the disclosures of which are incorporated herein by reference in their entirety.

BACKGROUND

The present disclosure relates to a method for balancing states of charge of a battery having a plurality of battery cells, to a battery management system which comprises the method according to the disclosure, to a battery, in particular a lithium-ion battery, having the battery management system according to the disclosure, and to a motor vehicle having the battery according to the disclosure. The battery can be used, in particular, to drive the motor vehicle.

In the future it is expected that, for stationary applications such as, for example, wind turbine systems, emergency current units or island networks, as well as in vehicles such as, for example, hybrid vehicles or pure electric vehicles, battery systems will increasingly be used on which stringent requirements are made in terms of useful energy content, charging/discharging efficiency and reliability.

In order to be able to meet with the requirements with respect to available energy content, maximum power and overall voltage, many individual battery cells are connected in series and partially additionally in parallel. For example, in hybrid vehicles and electric vehicles, battery packs are used comprising Li ions or NiMH technology, which battery packs are composed of a large number of electrochemical cells connected in series.

Such a large number of battery cells which are connected in series entail a number of problems. For safety reasons and in order to achieve sufficient accuracy in the measurement of the voltage, the cell voltages of the individual battery cells must be measured individually and checked for compliance with upper limits and lower limits. Because of the series connection of the battery cells, the same current flows through all the battery cells, i.e. the quantity of the charge which is extracted during discharging and input during charging is also identical for all the battery cells. As a result, the cell with the lowest capacity limits the overall charge of the pack. Since as a rule there is a direct relationship between the loss of capacity and the increase in internal resistance for electrochemical cells, the cell with the lowest capacity generally also has the lowest power. If the capacity of a battery cell therefore differs from that of another, for example due to aging, the battery cells with a relatively high capacity can only be charged as far as the battery cell with the lowest capacity. Furthermore, the defect in an individual battery cell causes the entire battery to fail because the current can no longer flow through the defective battery cell and therefore through the battery.

A measure of the quantity of energy stored in a battery cell is what is referred to as the state of charge (SOC). It is to be noted here that the initial states of charge of the battery cells when they are assembled to form a battery will never be precisely the same. Furthermore, owing to a certain product variation during manufacture, the battery cells always differ slightly in their parameters and therefore also in their reaction of the state of charge to a current which is impressed from the outside. These differences can increase further due to aging of the battery cells. It is known to use a battery management system to monitor the states of charge of a battery. In addition to the monitoring of safety, the longest possible service life of the battery is to be ensured and it is to be ensured that the states of charge of the individual cells are matched to one another. This is done by suitable cell balancing. Cell balancing or balancing of the states of charge is generally performed resistively. For this purpose, a resistor and a switching element are provided for each cell in order to be able to discharge individual cells in a targeted fashion. DE 10 2006 022 394 A1 discloses a device for balancing the charge of an energy source with a plurality of cells, in which balancing process the cells are connected to a discharging unit which has the purpose of balancing charges and at least partially discharges the cells. However, according to the prior art, it is also possible to carry out the cell balancing capacitively, i.e. with connected capacitors, or inductively, that is to say by means of connected inductors. In these two cases, energy can be exchanged between the cells with a limited efficiency while in the case of resistive cell balancing energy can only be converted into heat, and is therefore lost.

For hybrid vehicles, a high performance level is advantageous at any time, both in the charging direction for the purpose of recuperation and in the discharging direction for the purpose of acceleration. It is known that the maximum permitted charging power decreases as the state of charge rises, while the maximum permitted discharging power increases. For this reason, according to the prior art it would be desirable to operate a battery pack for hybrid vehicles in a state of charge of 50%. However, as a rule, in practice an operating window is used, for example between 40% and 60% of the state of charge. For what are referred to as "plug-in hybrids", the operating window is correspondingly larger, for example 10% to 90% of the state of charge.

A contemporary balancing strategy attempts to achieve a continuously equal state of charge of all the cells. For this purpose, as a rule, balancing to an identical quiescent voltage of all the cells is performed. In the case of new cells with a virtually identical capacity, this strategy is justified. However, in the case of cells with differing capacities, such as occur due to production variations and aging, this balancing strategy leads to unnecessary energy losses as a result of the balancing.

SUMMARY

According to the disclosure, a method for balancing states of charge of a battery having a number of N battery cells is presented, which method firstly comprises the step of determining the individual cell capacities $Cap_n$ of all the n=1 to N cells. This is followed by the determination of a k-th cell with the smallest cell capacity $Cap_k$ of the n=1 to N cells and the determination of the individual states of charge $SOC_n$ of all the n=1 to N cells. The determination of the depth of discharge $DOD_n$ of all the n=1 to N cells then follows. This can preferably take place according to the equation $DOD_n = Cap_n - SOC_n * Cap_n$. In a further step, a target depth of discharge $DOD_{Target,n}$ is then determined for all the n=1 to N cells, with $DOD_{Target,n} = Cap_n/2 + DOD_k - Cap_k/2$. From the target depth of discharge, the target state of charge $SOC_{Target,n}$ is determined for all n=1 to N cells from $SOC_{Target,n} = 1 - DOD_{Target,n}/Cap_n$. After this, the deviation of the state of charge $SOC_n$ of one cell from its target state of charge $SOC_{Target,n}$ is determined for all the n=1 to N cells according to $\Delta SOC_{Target,n} = SOC_n - SOC_{Target,n}$. In a further step, the minimum deviation $\Delta SOC_{min}$ of the state of charge $SOC_n$ of a cell from its target state of charge $SOC_{Target,n}$ is determined for all n=1 to N cells from $\Delta SOC_{min} = \min(\Delta SOC_{Target,n})$. This is then followed by the discharging of at least one of the n=1 to N cells for which the following applies: $\Delta SOC_{Target,n} - \Delta SOC_{min} > X$ where X is a parameter for which $X \leq 0$ applies. If $\Delta SOC_{Target,n} - \Delta SOC_{min} \leq X$ then applies for all of the n=1 to N cells, the method is then ended. However, if this does not apply, that is to say for at least one cell $\Delta SOC_{Target,n} - \Delta SOC_{min} > X$, then the process returns to the step of determining the individual states of charge and the subsequent steps are repeated.

In other words, the states of charge of N individual electrochemical battery cells of a battery are balanced. The method according to the disclosure has the advantage that the energy losses are reduced compared to the prior art within the scope of balancing of the states of charge. In this context, at the same time the efficiency in the target charge state is optimized. The duration of the balancing is reduced. There is no need to use any further hardware for balancing. The method can be implemented as a computer program using software, and can therefore be implemented cost-effectively.

In the discharging step, all the cells for which $\Delta SOC_{Target,n} - \Delta SOC_{min} > X$ applies can preferably be discharged, and even more preferably they can be discharged simultaneously. This reduces the duration of the balancing further.

The return to the step of determining the states of charge can preferably be performed at predefined time intervals. However, it can also take place continuously.

The state of charge is preferably specified in percentages, and the parameter X is preferably greater than zero and smaller than 6%, even more preferably smaller than 3%.

The method can advantageously also be used for capacitively and inductively balancing states of charge. In addition, after the discharging step and before the step of returning to the determination of the states of charge, it then comprises the step of feeding in the discharge current of the discharged cells in order to charge at least one of the n=1 to N cells for which the following applies: $\Delta SOC_{Target,n} - \Delta SOC_{min} < Y$, where $X > Y$.

In one preferred exemplary embodiment, all the cells for which $\Delta SOC_{Target,n} - \Delta SOC_{min} < Y$ applies are charged, and are more preferably charged simultaneously.

Accordingly, a battery management system is proposed for a battery, in particular an Li-ion battery which comprises the method according to the disclosure which is described above.

Analogously, a battery, in particular an Li-ion battery, is specified, with a battery management system according to the disclosure, and a motor vehicle with a battery according to the disclosure is specified.

Advantageous developments of the disclosure are specified in the dependent claims and described in the description.

BRIEF DESCRIPTION OF THE DRAWINGS

Exemplary embodiments of the disclosure are illustrated in the drawings and explained in more detail in the following description.

In said drawings.

DETAILED DESCRIPTION

The present disclosure relates to a method for balancing the states of charge of individual cells of a battery or of a battery pack, in particular of an Li-ion battery of an Li-ion battery pack.

Figure 1:
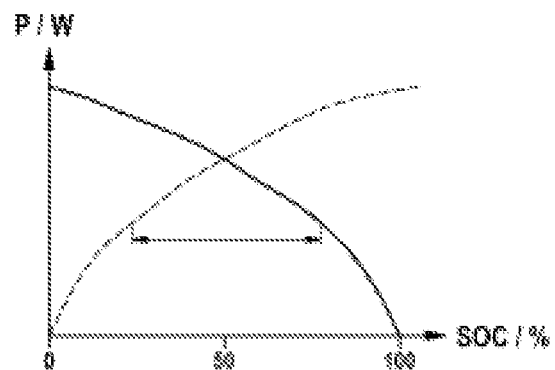
FIG. 1 shows the discharge power and the charge power of a battery according to the prior art, as a function of the state of charge.

FIG. 1 is a schematic view of the relationship between the state of charge and the charge power or discharge power for electrochemical cells. In FIG. 1, the state of charge SOC is given as percentages on the X axis. The Y axis shows the power in watts. The dashed curve shows the discharge power, the continuous curve shows the charge power. The range which is illustrated represents the optimum operating range. It is apparent from FIG. 1 that the maximum permitted charge power decreases as the state of charge rises, while the maximum permitted discharge power increases. For this reason, an operating window about the 50% state of charge value is used in practice.

Figure 2:
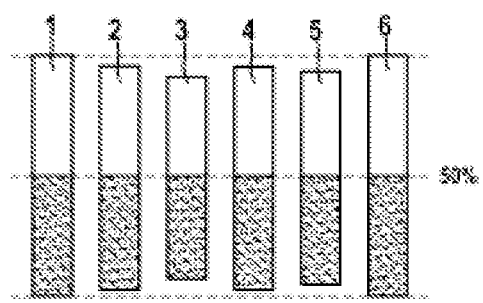
FIG. 2 shows the states of charge of a battery according to the prior art with six individual cells in the case of a total state of charge of the battery of 50%.
Figure 3:
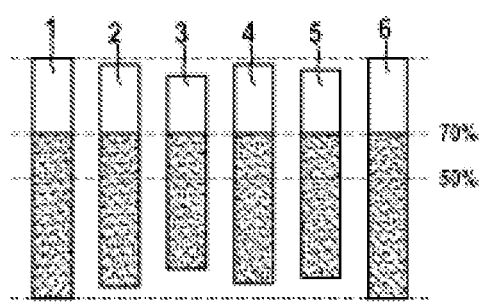
FIG. 3 shows the states of charge of a battery according to the prior art with six individual cells in the case of an overall state of charge of the battery of 70%.

A contemporary balancing strategy of the prior art attempts to achieve a state of charge of all the cells which is always constant. For this purpose, balancing is generally carried out to an identical quiescent voltage of all the cells. In new cells with almost identical capacities, this strategy is justified. However, in the case of cells with different capacities, such as occur due to production variations and aging, this balancing strategy leads to unnecessary energy losses as a result of the balancing. This is illustrated by FIGS. 2 and 3. Said figures show, by means of an example, a battery pack composed of six individual cells which have a different capacity. FIG. 1 shows the battery cells in a state of charge of 50%, FIG. 2 shows the battery cells in a state of charge of 70%. As is apparent from the figures, the six individual cells of the battery all have a different capacity, which is symbolized by the illustrated boxes. If all the cells are in an individual state of charge of 50% (see FIG. 2), the total pack also has a state of charge of 50% and the maximum power is available in the discharging direction and charging direction. However, if the battery pack is operated for a relatively long time with, for example, a state of charge of 70%, all the cells are balanced to an individual state of charge of 70% (see FIG. 3). When the pack is discharged to, for example, 50%, according to this strategy all the cells must then be balanced to 50%, which means that in all the cells energy has to be unnecessarily destroyed apart from in the one with the lowest capacity. For this reason, this simple balancing strategy is insufficient, in particular for hybrid vehicles and electric vehicles.

Figure 4:
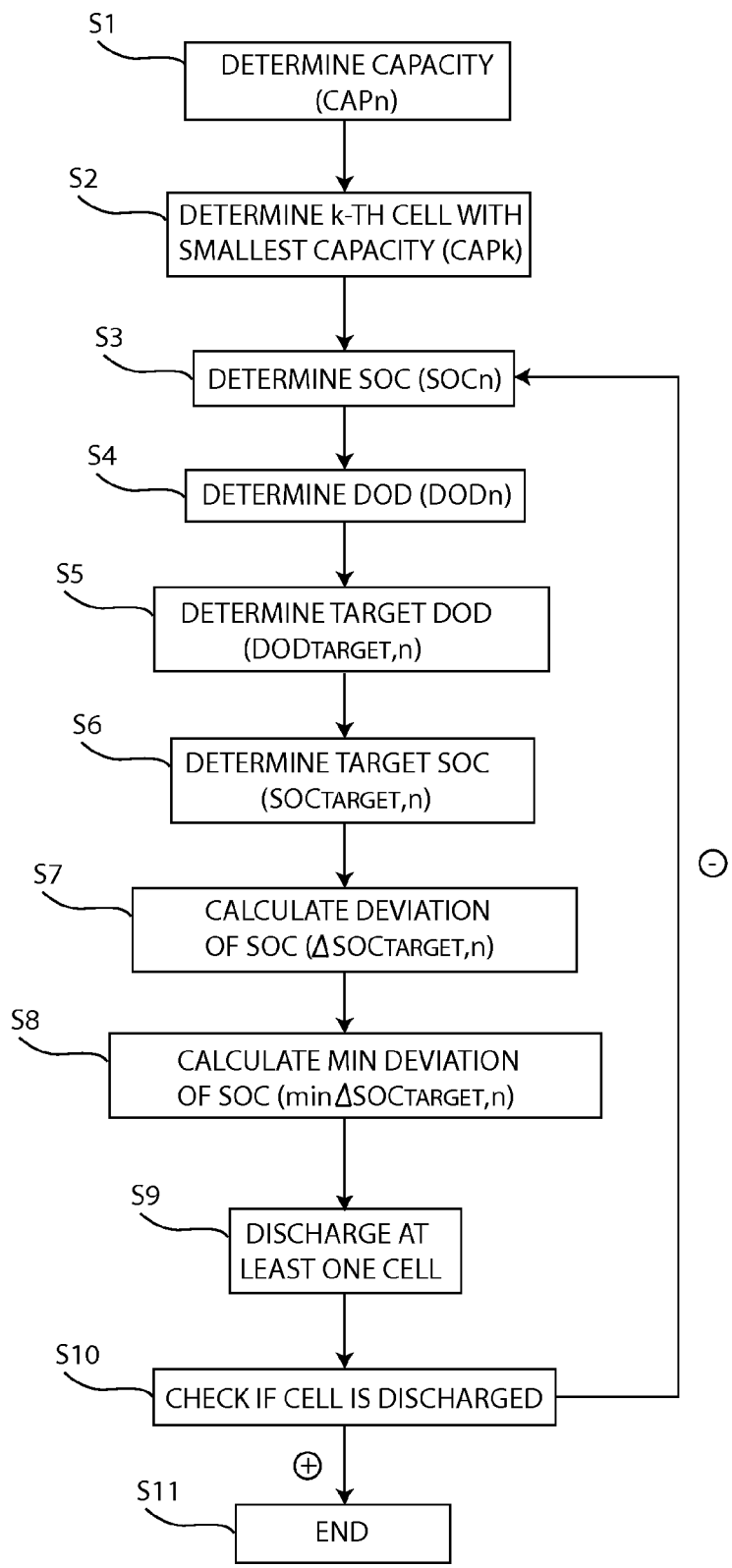
FIG. 4 shows the method according to the disclosure for balancing the states of charge of individual cells of a battery in a schematic illustration.

FIG. 4 is a schematic view of a method according to the disclosure of the states of charge of individual cells of a battery with n=1 to N cells. The core of the disclosure is the balancing of all the cells of a battery pack, in such a way that, despite different capacities, in the case of a state of charge of 50% of the pack, the cells have an individual state of charge of 50%. When there are other states of charge, different individual states of charge occur depending on the cell capacity, with the result that less effort has to be expended on balancing.

In the following method, the state of charge is given as a percentage with "SOC" (State of Charge), where 100% corresponds to the state in which the cell is fully charged. The capacity of a cell is abbreviated with "Cap" and is given in the text which follows using the unit "Ah". The depth of discharge is abbreviated with DOD (Depth of Discharge), and is also given in "Ah". Given a depth of discharge of 0Ah, the cell is fully charged. The depth of discharge is calculated from DOD=(1−SOC)*Cap.

For the purpose of balancing all the N cells of a battery pack in such a way that, despite different capacities, in the case of 50% state of charge of the total battery pack they always have an individual state of charge of 50%, the following method can be advantageously applied:

S1 Determination of the individual cell capacities $Cap_n$ of all the n=1 to N cells;

S2 Determination of a k-th cell with the smallest cell capacity $Cap_k$ of the n=1 to N cells;

S3 Determination of the individual states of charge $SOC_n$ of all the n=1 to N cells;

S4 Determination of the depth of discharge $DOD_n$ of all the n=1 to N cells;

S5 Determination of the target depth of discharge $DOD_{Target,n}$ for all the n=1 to N cells from: $DOD_{Target,n}=Cap_n/2+DOD_k-Cap_k/2$;

S6 Determination of a target state of charge $SOC_{Target,n}$ for all the n=1 to N cells from: $SOC_{Target,n}=1-DOD_{Target,n}/Cap_n$;

S7 Calculation of the deviation of the state of charge $SOC_n$ of a cell from its target state of charge $SOC_{Target,n}$ for all the n=1 to N cells:

$$\Delta SOC_{Target,n}=SOC_n-SOC_{Target,n};$$

S8 Calculation of the minimum deviation $\Delta SOC_{min}$ of the state of charge $SOC_n$ of a cell from its target state of charge $SOC_{Target,n}$ for all the n=1 to N cells: $\Delta SOC_{min}=\min \Delta SOC_{Target,n}$;

S9 Discharging of at least one of the n=1 to N cells for which the following applies:

$$\Delta SOC_{Target,n}-\Delta SOC_{min}>X,$$

where X is a parameter for which X≥0;

S10 If $\Delta SOC_{Target,n}-\Delta SOC_{min}\leq X$ applies to all of the n=1 to N cells, the process jumps to the next step (S11); if this does not apply to all the cells, the process returns to the step S3 of the determination of the individual states of charge S3 and the following steps are repeated;

S11 Ending of the method.

The above method relates in this context firstly to the resistive balancing of states of charge. In the case of resistive balancing, the cells can merely be discharged, with the result that in the case of resistive balancing, only the discharging in step S9 is significant. In another exemplary embodiment, the capacitive or inductive balancing is also described, during which cells can also be charged.

In one preferred embodiment, the method according to the disclosure is part of a battery management system of a battery. In the text which follows, it is therefore described by way of example that the method according to the disclosure is carried out by means of a battery management system. However, this does not occur in a restrictive fashion but rather merely in an exemplary fashion.

The respective variables which are necessary for the course of the method can be subsequently calculated mathematically or determined or measured in some other way, for example by means of specification sheets.

In Step 1, the cell capacities are preferably determined or measured by means of a battery management system. In the next Step S2, the cell with the lowest cell capacity is then determined from the acquired data. Owing to the series connection of the cells, the cell with the lowest capacity limits the total charge of the pack. Since, as a rule, there is a direct relationship between loss of capacity and an increase in the internal resistance for electrochemical cells, the cell with the lowest capacity generally also has the lowest power. Therefore, in the method according to the disclosure, the balancing is performed with respect to the capacity or depth of discharge of the cell with the lowest capacity. In Step S3, the state of charge of each individual electrochemical cell of the battery is determined or measured. This is in turn preferably carried out using the battery management system. The depth of discharge is then calculated from the individual state of charge by means of the equation specified in Step S4, or is determined or measured in some other way. In Step S5, a desired target depth of discharge is then calculated therefrom for each cell. This target depth of discharge is calculated here as a function of the capacity and the depth of discharge of the cell with the lowest capacity. The target state of charge is then calculated from the target depth of discharge according to the equation specified above in Step S6. For balancing, in Step S7 the deviation of the present state of charge from the target state of charge $\Delta SOC_{Target,n}=SOC_n-SOC_{Target,n}$ for each cell is determined or calculated. The minimum deviation $\Delta SOC_{min}$ is then determined from the deviations (S8). If the difference between the deviation $\Delta SOC_{Target,n}=SOC_n-SOC_{Target,n}$ and the minimum deviation $\Delta SOC_{min}$ is then greater than a parameter X which is predefined or can be selected, at least one of those cells for which this applies is discharged (S9). All the cells are preferably discharged simultaneously. In Step S10 it is checked whether in fact a cell is discharged or is to be discharged. If the answer is affirmative, the process jumps back to the step S3 and the method is resumed from there. However, if a cell no longer has to be discharged, the process jumps to the next step and the method is ended (S11).

In this context, the jump back in Step S10 can occur continuously (if the computing time is short compared to the discharging process) or else discretely at fixed time intervals, for example 1-10 times per second. However, depending on the accuracy of the method, a time period of minutes may also be appropriate. It is therefore an iterative method in which the parameter X specifies precisely how balancing is to be performed. The parameter X may be an element of the real or natural positive numbers including the zero. X can be smaller than 10%, and X is preferably smaller than 6%, and even more preferably smaller than 3%. A relatively high parameter speeds up the method, but makes the adaptation less precise. A low parameter leads to a relatively low bandwidth of the individual states of charge after the balancing but a longer adaptation period.

Table 1 shows an exemplary embodiment of the method according to the disclosure for the resistive balancing of a battery, in particular of an Li-ion battery with six individual cells. The parameter X for the discharging is, for example, 4% here. As is apparent from Table 1, the cell 3 is the cell with the lowest capacity, here 4.3 Ah and has a state of charge of 64%. What is referred to as the target depth of discharge $DOD_{Target}$ of the individual cells is then a function of this smallest capacity and of the instantaneous depth of discharge of the respective cell with the minimum capacity. In the example shown, the cell 5 has a lower state of charge of 60% compared to 64% in cell 3. For this reason, the cell 5 also has the value with the lowest deviation from the target state of charge, specifically a negative deviation of −3%. Since the difference between the deviation of the target state of charge from the actual state of charge and the minimum deviation is zero for the cell 5, this cell is not discharged. In the case of a deviation threshold value X of 4%, in the present example, the cells 1, 2, 4 and 6 are discharged in the first step. The further profiles of the iterative method are not illustrated.

TABLE 1

Example 1 for a battery with 6 individual cells where X = 4%.

| Cell | Cap [Ah] | SOC | DOD [Ah] | Min. Cap | $DOD_{Target}$ | $SOC_{Target}$ | $\Delta SOC_{Target}$ | $\Delta SOC_{min}$ | $\Delta SOC_{Target} - \Delta SOC_{min}$ | Balancing |
|---|---|---|---|---|---|---|---|---|---|---|
| 1 | 5.0 | 67% | 1.65 |   | 1.90 | 62% | 5% |     | 8%  | yes |
| 2 | 4.6 | 66% | 1.56 |   | 1.70 | 63% | 3% |     | 6%  | yes |
| 3 | 4.3 | 64% | 1.55 | X | 1.55 | 64% | 0% |     | 3%  |     |
| 4 | 4.7 | 70% | 1.41 |   | 1.75 | 63% | 7% |     | 11% | yes |
| 5 | 4.5 | 60% | 1.80 |   | 1.56 | 63% | −3% | −3% | 0%  |     |
| 6 | 5.0 | 66% | 1.70 |   | 1.90 | 62% | 4% |     | 7%  | yes |

Figure 5:
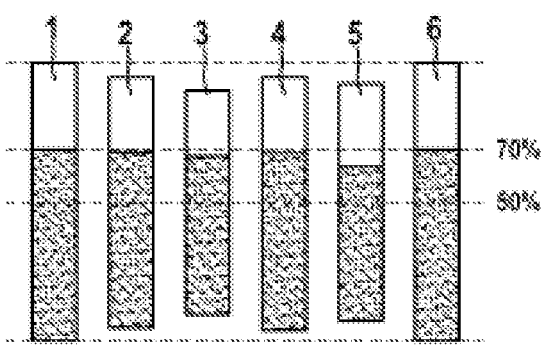
FIG. 5 shows a result of the balancing of the battery from FIG. 1 with the method according to the disclosure.

FIG. 5 shows a schematic view of a result of the exemplary embodiment of the disclosure of the Table 1, that is to say of an executed balancing process performed on the states of charge of n=1 to N individual cells of the battery of the cell according to the inventive optimized method. As is apparent from FIG. 5, the six individual cells of the battery all have a different capacity which is symbolized by the represented box. The cells 1 and 6 have the largest capacity, followed by cell 4, cell 2, cell 5 and cell 3, in a decreasing order of the individual capacity. After the method has been applied for balancing the states of charge of the individual cells, the individual states of charge of the cells differ from the 70% state of charge of the total pack.

For the purpose of comparison, FIG. 3 shows that, after balancing of a battery with six individual cells, according to a method from the prior art, with a state of charge of 70% of the total pack, all the cells have the same individual state of charge. In order to achieve this identical state of charge, a relatively high expenditure is necessary here compared to the method according to the disclosure.

On the other hand, after discharging to 50% of the state of charge of the total pack all the n=1 to N cells would also have a 50% state of charge, given a correspondingly low value of the deviation threshold value X. If the state of charge of the cell with the smallest capacity in Table 1 is changed to 50%, the target state of charge for all cells is, in fact, also 50%, as is shown by Table 2. This follows from the fact that the depth of discharge DOD is a function of the state of charge SOC. According to DOD=(1−SOC)*Cap, the depth of discharge for the cell k with the lowest capacity and a state of charge of 50% is precisely half the capacity of the cell, that is to say $DOD_k = Cap_k/2$. The following then applies for the target depth of charge of each further cell of the cells $DOD_{Target,n} = Cap_n/2$. The target depth of charge therefore has the value of half the individual capacity. The target state of charge is then 50%, as desired.

In a further exemplary embodiment, the method is also adapted for capacitive and inductive balancing of the states of charge. In this context, in Step S9 of the method the discharge current of the discharged cells is used for charging other cells. At least one of the cells for which $\Delta SOC_{Target,n} - \Delta SOC_{min} < Y$ applies is then charged, where X>Y. All the cells for which the relationship applies are preferably charged together. The parameter Y can be freely selected within the specified limits with respect to the parameter X.

The method according to the disclosure is preferably implemented as software in a battery management system of a battery. This software solution permits the method to be implemented in a way which is as cost-effective and flexible as possible.

The battery with the corresponding battery management system may be part of a motor vehicle. It is preferably part of a drive system of a motor vehicle and coupled to the engine of the motor vehicle.

The invention claimed is:

1. A method for balancing states of charge of a battery having a number of N battery cells, comprising:
   determining the individual cell capacities ($Cap_n$) of all the n=1 to N cells;
   determining a k-th cell with the smallest cell capacity ($Cap_k$) of the n=1 to N cells;
   determining the individual states of charge ($SOC_n$) of all the n=1 to N cells;
   determining the depth of discharge ($DOD_n$) of all the n=1 to N cells;
   determining the target depth of discharge ($DOD_{Target,n}$) for all the n=1 to N cells from: $DOD_{Target,n} = Cap_n/2 + DOD_k - Cap_k/2$;
   determining a target state of charge ($SOC_{Target,n}$) for all the n=1 to N cells from: $SOC_{Target,n} = 1 - DOD_{Target,n}/Cap_n$;

TABLE 2

Example 1 of a battery with 6 individual cells with X = 1%.

| Cell | Cap [Ah] | SOC | DOD [Ah] | Min. Cap | $DOD_{Target}$ | $SOC_{Target}$ | $\Delta SOC_{Target}$ | $\Delta SOC_{min}$ | $\Delta SOC_{Target} - \Delta SOC_{min}$ | Balancing |
|---|---|---|---|---|---|---|---|---|---|---|
| 1 | 5.0 | 67% | 1.65 |   | 2.50 | 50% | 17% |    | 17% | yes |
| 2 | 4.6 | 66% | 1.56 |   | 2.30 | 50% | 16% |    | 16% | yes |
| 3 | 4.3 | 50% | 2.15 | X | 2.15 | 50% | 0%  | 0% | 0%  |     |
| 4 | 4.7 | 70% | 1.41 |   | 2.35 | 50% | 20% |    | 20% | yes |
| 5 | 4.5 | 60% | 1.80 |   | 2.25 | 50% | 10% |    | 10% | yes |
| 6 | 5.0 | 66% | 1.70 |   | 2.50 | 50% | 16% |    | 16% | yes | determining the deviation of the state of charge ($SOC_n$) of a cell from its target state of charge ($SOC_{Target,n}$) for all the n=1 to N cells: $\Delta SOC_{Target,n} = SOC_n - SOC_{Target,n}$;

determining the minimum deviation ($\Delta SOC_{min}$) of the state of charge ($SOC_n$) of a cell from its target state of charge ($SOC_{Target,n}$) for all the n=1 to N cells: $\Delta SOC_{min} = \min(\Delta SOC_{Target,n})$; and discharging at least one of the n=1 to N cells for which the following applies: $\Delta SOC_{Target,n} - \Delta SOC_{min} > X$, where X is a parameter for which $X \geq 0$;

wherein, if $\Delta SOC_{Target,n} - \Delta SOC_{min} \leq X$ applies to all of the n=1 to N cells, the method ends or, if $\Delta SOC_{Target,n} - \Delta SOC_{min} \leq X$ does not apply to all of the n=1 to N cells, the method repeats from the determination of the individual states of charge.

2. The method as claimed in claim 1, wherein all the cells for which $\Delta SOC_{Target,n} - \Delta SOC_{min} \geq X$ applies are discharged.

3. The method as claimed in claim 1, wherein the repetition of the determination of the individual states of charge is performed at predefined time intervals.

4. The method as claimed in claim 1, wherein the the repetition of the determination of the individual states of charge is performed continuously.

5. The method as claimed in claim 1, wherein the state of charge (SOC) is specified in percentages and the parameter X is greater than zero and smaller than 6%.

6. The method as claimed in claim 5, where the X parameter is smaller than 3%.

7. The method as claimed in claim 1, the discharging at least one of the n=1 to N cells further comprising, in order to balance states of charge capacitively and inductively, feeding in the discharge current of the discharged cells in order to charge at least one of the n=1 to N cells for which the following applies: $\Delta SOC_{Target,n} - \Delta SOC_{min} < Y$, where $X > Y$.

8. The method as claimed in claim 7, wherein all the cells for which $\Delta SOC_{Target,n} - \Delta SOC_{min} < Y$ applies are charged simultaneously.

9. A battery management system for a battery having a number of N battery cells, the battery management system being configured to implement a method for balancing states of charge of the battery, the method including:

determining the individual cell capacities ($Cap_n$) of all the n=1 to N cells;

determining a k-th cell with the smallest cell capacity ($Cap_k$) of the n=1 N cells;

determining the individual states of charge ($SOC_n$) of all the n=1 to N cells;

determining the depth of discharge ($DOD_n$) of all the n=1 to N cells;

determining the target depth of discharge ($DOD_{Target,n}$) for all the n=1 to N cells from: $DOD_{Target,n} = Cap_n/2 + DOD_k - Cap_k/2$;

determining a target state of charge ($SOC_{Target,n}$) for all the n=1 to N cells from: $SOC_{Target,n} = 1 - DOD_{Target,n}/Cap_n$;

determining the deviation of the state of charge ($SOC_n$) of a cell from its target state of charge ($SOC_{Target,n}$) for all the n=1 to N cells: $\Delta SOC_{Target,n} = SOC_n - SOC_{Target,n}$;

determining the minimum deviation ($\Delta SOC_{min}$) of the state of charge ($SOC_n$) of a cell from its target state of charge ($SOC_{Target,n}$) for all the n=1 to N cells: $\Delta SOC_{min} = \min(\Delta SOC_{Target,n})$; and discharging at least one of the n=1 to N cells for which the following applies: $\Delta SOC_{Target,n} - \Delta SOC_{min} > X$, where X is a parameter for which $X \geq 0$;

wherein, if $\Delta SOC_{Target,n} - \Delta SOC_{min} \leq X$ applies to all of the n=1 to N cells, the method ends or, if $\Delta SOC_{Target,n} - \Delta SOC_{min} \leq X$ does not apply to all of the n=1 to N cells, the method repeats from the determination of the individual states of charge.

10. A battery having a number of N battery cells, comprising:

a battery management system configured to implement a method for balancing states of charge of the battery, the method including:

determining the individual cell capacities ($Cap_n$) of all the n=1 to N cells;

determining a k-th cell with the smallest cell capacity ($Cap_k$) of the n=1 N cells:

determining the individual states of charge ($SOC_n$) of all the n=1 to N cells;

determining the depth of discharge ($DOD_n$) of all the n=1 to N cells;

determining the target depth of discharge ($DOD_{Target,n}$) for all the n=1 to N cells from: $DOD_{Target,n} = Cap_n/2 + DOD_k - Cap_k/2$;

determining a target state of charge ($SOC_{Target,n}$) for all the n=1 to N cells from: $SOC_{Target,n} = 1 - DOD_{Target,n}/Cap_n$;

determining the deviation of the state of charge ($SOC_n$) of a cell from its target state of charge ($SOC_{Target,n}$) for all the n=1 to N cells: $\Delta SOC_{Target,n} = SOC_n - SOC_{Target,n}$;

determining the minimum deviation ($\Delta SOC_{min}$) of the state of charge ($SOC_n$) of a cell from its target state of charge ($SOC_{Target,n}$) for all the n=1 to N cells: $\Delta SOC_{min} = \min(\Delta SOC_{Target,n})$; and discharging at least one of the n=1 to N cells for which the following applies: $\Delta SOC_{Target,n} - \Delta SOC_{min} > X$, where X is a parameter for which $X \geq 0$;

wherein, if $\Delta SOC_{Target,n} - \Delta SOC_{min} \leq X$ applies to all of the n=1 to N cells, the method ends or, if $\Delta SOC_{Target,n} - \Delta SOC_{min} \leq X$ does not apply to all of the n=1 to N cells, the method repeats from the determination of the individual states of charge.

11. The battery as claimed in claim 10, wherein the battery is an Li-ion battery.

* * * * *